(12) United States Patent
Alicherry et al.

(10) Patent No.: US 8,346,515 B2
(45) Date of Patent: Jan. 1, 2013

(54) METHODS AND APPARATUS FOR LINE SYSTEM DESIGN

(75) Inventors: Mansoor Ali Khan Alicherry, Scotch Plains, NJ (US); Randeep Singh Bhatia, Somerset, NJ (US)

(73) Assignee: Alcatel Lucent, Paris (FR)

(*) Notice: Subject to any disclaimer, the term of this patent is extended or adjusted under 35 U.S.C. 154(b) by 2232 days.

(21) Appl. No.: 10/722,651

(22) Filed: Nov. 26, 2003

(65) Prior Publication Data

US 2005/0114100 A1 May 26, 2005

(51) Int. Cl.
G06F 7/60 (2006.01)
G06F 17/10 (2006.01)

(52) U.S. Cl. ............... 703/2; 455/266; 370/238

(58) Field of Classification Search ........... 455/266; 725/95; 370/238; 703/2
See application file for complete search history.

(56) References Cited

U.S. PATENT DOCUMENTS

| | | | | |
|---|---|---|---|---|
| 6,662,297 | B1* | 12/2003 | Boom et al. ............... | 712/245 |
| 6,697,333 | B1* | 2/2004 | Bawa et al. ............... | 370/238 |
| 7,042,846 | B2* | 5/2006 | Bauer ....................... | 370/238 |
| 2004/0061701 | A1* | 4/2004 | Arquie et al. ............. | 345/440 |

OTHER PUBLICATIONS

Bar-Noy et al., "On Chromatic Sums and Distributed Resource Allocation," Information and Computation 140, 183-202, 1998.*
Shih et al., "An Approximation Algorithm for Coloring Circular-Arc Graphs," Siam Conference on Discrete Mathematics, 1990.*
Ramaswami et al., "Routing and Wavelength Assignment in All-Optical Networks," IEEE/ACM Transactions on Networking, vol. 3, pp. 489-499, 1995.*
Alicherry, M. and R. Bhatia. "Line System Design and a Generalized Coloring Problem." ESA 2003, LNCS 2832, pp. 19-30, 2003.*
V. Kumar, "Approximating Circular Arc Colouring and Bandwidth Allocation in All-Optical Ring Networks," Procs. of the International Workshop on Approximation Algorithms for Combinatorial Optimization, Lecture Notes in Computer Science, 1998, pp. 147-158.
S. Nicoloso et al., "On the Sum Coloring Problem on Interval Graphs," Algorithmica, 1999, pp. 109-126, vol. 23.
A.E. Ozdaglar et al., "Routing and Wavelength Assignment in Optical Networks," IEEE/ACM Transactions on Networking, Apr. 2003, pp. 259-272, vol. 11, No. 2.
R. Ramaswami et al., "Routing and Wavelength Assignment in All-Optical Networks," IEEE/ACM Transactions on Networking, Oct. 1995, pp. 489-499. vol. 3, No. 5.
P. Winkler et al., "Wavelength Assignment and Generalized Interval Graph Coloring," Procs. Symposium on Discrete Algorithms (SODA), 2003, pp. 830-831.

* cited by examiner

*Primary Examiner* — David Silver

(74) *Attorney, Agent, or Firm* — Ryan, Mason & Lewis, LLP

(57) ABSTRACT

Line system design techniques are provided for use in performing routing and coloring operations associated with one or more demands. In one aspect of the invention, a technique for designing a line system comprises the following steps/operations. A set of one or more demands is obtained for use in computing the line system design. The line system design is then represented as a graph in accordance with a graph coloring operation wherein colors represent bandwidths such that bandwidths are assigned and the one or more demands are routed so as to attempt to achieve a minimum total design cost. The line system being designed may be an optical line system.

28 Claims, 7 Drawing Sheets

*FIG. 4A*

<u>Methodology $A$</u>
$m(o) = 0$
for $p = 1$ to line system load$/2$
{
    $l(p) = 0;\ m(p) = m(p-1) + 2;$
    for $i = 1$ to $n - 1$
    {
        $l_i(p) \leftarrow$ load on link $e_i$
        if($l_i(p) = 0$)
        {
            Divide the line system into two line systems;
            one from node 0 to node $(i-1)$; the other from
            node $i$ to node $(n-1)$ and call methodology $A$
            on these line systems separately.
        }
        if($l_i(p) > l(p)$)
        {
            $l(p) = l_i(p)$
        }
    }
    create a multigraph $G = (V, E)$, where $V = \{0, ...n - 1\}$
    for all demand $(i, j)$ in $D$
    {
        create an edge $(i - 1, j)$ in $G$
    }
    for $i = 1$ to $n - 1$
    {
        if $l_i(p) < l(p)$
            add an edge $(i - 1, i)$ in $G$
    }
    set the capacity of each edge in $G$ to 1
    find a 2-unit flow from node 0 to node $(n - 1)$ in $G$
    Let $p1$ and $p2$ be the path for the flow
    For all the demands corresponding to links in $p1$.
    {
        Assign the color $c_{m(p)}$ to demand
        remove the demand from $D$
    }
    For all the demands corresponding to links in $p2$
    {
        Assign the color $c_{m(p)+1}$ to demand
        remove the demand from $D$
    }
}

FIG. 4B

Routing Phase:
   if $(L(R_s) \geq n(1 + \epsilon)/\epsilon)$
      Output $R_s$
   else {

Compute $D_1 = \{d \in D|$ $d$ in any routing goes through at least $n/3$ links$\}$
      Compute $D_2 = D - D_1$
      Compute $R_1 =$ the set of all possible routings for demands in $D_1$
      Compute $R_2 =$ the set of all possible routings for demands in $D_2$
      in which at most $3S$ demands are not routed on shortest paths
      Compute $R = R_1 \times R_2$
      Compute $r \in R$ such that $L(r) = \min_{r' \in R} L(r')$
      Output $r$

}

Coloring Phase:
    $U = D$
    $M =$ the set of available colors
    $l = \min_{e_i \in L} l_i(U)$ (the min. load of demands in $U$)
    while $(l > 0)$ {
        Compute $O = H(U)$ (see below)
        Compute $m = \{i, j|$ $i, j$ are the smallest two colors in $M$ }
        Color demands in $O$ with colors in $m$
        $U = U - O$
        $M = M - m$
        $l = \min_{e_i \in L} l_i(U)$
    } if $(U \neq \emptyset)$ {
            Color $U$ using methodology A

"Compute $O = H(U)$":
   Compute $d_0 =$ a demand in $U$ that goes through the largest number of links in $L$
   $O = \{d_0\}$
   $L' =$ set of links covered by demands in $O$
   $i = 1$
   while $(L' \neq L)$ {
      Compute $D_i = \{d|$ $d \in U - O$ & $d$ overlaps with $d_{i-1}\}$
      Compute $d_i = \{d|$ $d \in D_i$ & $d$ goes through the largest number of links in $L - L'\}$
      $i = i+1$
   output $O$
   }

Methodology B:

$e_0 = (-1, 0)$
$e_{n+1} = (n, n + 1)$
$L = L \cup \{e_0, e_{n+1}\}$
$D = D \cup \{(0, 0), (n + 1, n + 1)\}$
for all $(0 \leq i \leq j \leq n + 1)$ {
    $P(i, j) = \emptyset$
    $R(i, j) = \emptyset$
    best = 0
    for all $(i \leq i' \leq j' \leq j)$ {
        $E_1 = \{e_i, e_{i+1}, ... e_{i'}\} \cup \{e_{j'+1}, e_{j'+2}, ... e_j\}$
        $E_2 = e_{i'+1}, e_{i'+2}, ... e_{j'}$
        Compute coloring $C$ using methodology b1 where $E_1$ ($E_2$) links are colored with 1 (2) steps
        if($C \neq \emptyset$) {
            if($i' - i + j - j' + 1 \geq$ best) {
                $R(i, j) = C$
                best = $i' - i + j - j' + 1$
            }
        }
    }
}
Compute $L_1 = \{e_i | e_i \in L, l_i \leq |C_1|\}$
for all $(e_i, e_j \in L_1)$ {
    Compute $D_{i,j} = \{d| d \in D$, d goes through either link $e_i, e_j\}$
    Compute $P_{i,j}$ = coloring obtained by coloring the interval graph $D_{i,j}$ with colors in $C_1$
}
for all $(e_i, e_j \in L_1, i < j$ {
    best = 0
    for all$(m, i < m < j)$ {
        Compute the coloring $K = P(i, m) + P(m, j)$
        If($K = \emptyset$) continue
        Compute $n$ = number of links that are in one step in $K$
        if(best < $n$) {
            best = $n$
            $C = K$
        }
    }
    Compute $n$ = number of links that are in one step in $R(i, j)$
    if(best < $n$) {
        best = $n$
        $C = R(i, j)$
    }
    $P(i, j) = C$
}
Output $P(0, n + 1)$

Methodology $b1$:
Compute $C$ = interval graph coloring of demands $D_1$ using colors in $C_1$
if($C == \emptyset$) Output $C$
Compute $C'$ = interval graph coloring of the demands in $D - D_1$ using first available colors
Output $C' \cup C$

*FIG. 4E*

Methodology $c1$:
$V = \{0, 1,..., n-1\}$
$E = \emptyset$
for all demands $((i, j) \in D - D_1)$ {
    $E = E \cup \{(i - 1, j)\}$
    Directed link $(i - 1, j)$ has unit capacity
}
for all links $(e_i \in L)$ {
    $E = E \cup \{(i - 1, i)\}$
    Directed link $(i - 1, i)$ has capacity $|C_1| + |C_2| - l_i$
}
Graph $G = (V, E)$
Compute maxFlow = Max. Flow $f$ in $G$ from node 0 to node $n - 1$
if(maxFlow $< |C_2|$ ) Output $\emptyset$
Compute $F_1 = \{d | f$ puts zero flow on the edge $(i - 1, j)$ where demand $d = (i, j)\}$
Compute $F_1 = F_1 \cup D_1$
Compute $K_1$ = coloring that colors demands in $F_1$ with colors in $C_1$ only using interval graph coloring
Compute $K_2$ = coloring that colors demands in $D - F_1$ with colors in $C_2$ only using interval graph coloring
Output $K = K_1 \cup K_2$

METHODOLOGY D:

METHODOLOGY E:

METHODS AND APPARATUS FOR LINE SYSTEM DESIGN

FIELD OF THE INVENTION

The present invention relates to line system design techniques and, more particularly, to line system design techniques for use in performing routing and coloring operations associated with one or more demands.

BACKGROUND OF THE INVENTION

Over the last several years, there has been a tremendous growth in data traffic spurred primarily by the World Wide Web/Internet. This growth has resulted in a need for a large amount of bandwidth in the core networks of the Internet.

Optical wavelength division multiplexing networks with terabits of bandwidth per fiber form the back-bone of the current generation of the optical Internet. A dense wavelength division multiplexing (DWDM) system partitions the bandwidth of an optical fiber into multiple channels of data rates in tens of gigabits per second (Gbps), each operating at a distinct wavelength.

FIG. 1 illustrates an optical line system. Wavelengths are multiplexed at one end of the line system 100 and demultiplexed at the other end using what are called end terminals (e.g., 102-1 and 102-2). Wavelengths are selectively added or dropped at intermediate points, using devices called optical add-drop multiplexers or OADMs (e.g., 106-1 and 106-2). As the signal travels over the fiber, the signal loses its power level due to noise and fiber impairments. Optical amplifiers (e.g., 104-1 through 104-4) are placed at the intermediate points between the end terminals to boost the power level of the signal. It is to be understood that an optical line system may include a different number of amplifiers, OADMs, and terminals than are shown in FIG. 1.

Nonetheless, after some point, the quality of the signal gets so degraded that the signal has to be regenerated. This is done by demultiplexing the wavelengths, converting the optical signal to an electrical signal and then back to an optical signal (known as optical-electrical-optical or OEO conversion) using a device called a ring terminal (not expressly shown). A ring terminal is comprised of end terminals placed back to back. Wavelength conversion takes place during this regeneration operation.

Demands for a line system originate (or terminate) at the end terminals or at the OADMs. Each demand requires a wavelength, and multiple demands that go through any common part (segment) of a fiber are allocated or assigned different wavelengths.

Thus, a need exists for line system design systems with effective and efficient routing and bandwidth assignment techniques.

SUMMARY OF THE INVENTION

The present invention provides line system design techniques for use in performing routing and coloring operations associated with one or more demands.

In one aspect of the invention, a technique for designing a line system comprises the following steps/operations. A set of one or more demands is obtained for use in computing the line system design. The line system design is then represented as a graph in accordance with a graph coloring operation wherein colors represent bandwidths such that bandwidths are assigned and the one or more demands are routed so as to attempt to achieve a minimum total design cost.

The line system being designed may be an optical line system. Colors may be partitioned in sets and the sets are ordered so that colors in higher sets cost more than colors in lower sets. A link of the graph may represent a location of a component of the line system being designed. The cost of a link in a coloring may be equal to the cost of the most expensive set such that a demand going through the link is colored with a color in the most expensive set. Colors may be assigned to the demands such that no two demands routed on the same link of the graph are assigned the same color.

The line system being designed may be a linear line system. The line system design may be represented by an interval graph. The graph coloring operation may be computable to an $O(\sqrt{s})$-approximation, where s is a value proportional to a number of color sets. The graph coloring operation may be polynomially computable.

The line system being designed may be a circular line system. The graph coloring operation may be computable to a $2(1+\epsilon)$-approximation. A link of the graph may represent a location of a component of the circular line system being designed. A demand may be routed either clockwise or counterclockwise and colors may be assigned to demands such that no two demands routed on the same link are assigned the same color.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 2A and 2B are tables representing a summary of results obtained in accordance with various embodiments of the present invention;

FIGS. 4A through 4G are diagrams illustrating respective line system design methodologies in accordance with various embodiments of the present invention.

DETAILED DESCRIPTION OF PREFERRED EMBODIMENTS

Figure 1:
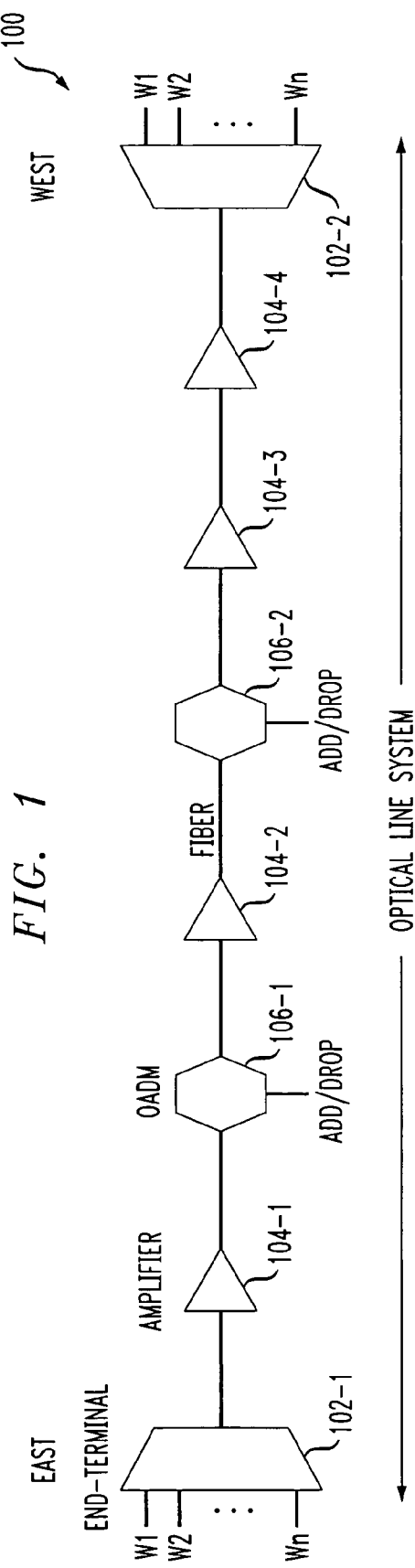
FIG. 1 is a block diagram illustrating an optical line system in accordance with which the present invention may be employed.

The following description will illustrate the invention in the context of an exemplary optical line system. It should be understood, however, that the invention is not necessarily limited to use with any particular type of line system. The invention is instead more generally applicable to any line system in which it is desirable to perform efficient routing and coloring operations. As used herein, the term "demand" generally refers to a bandwidth request between nodes. For example, a demand may be made for a wavelength between OADM 106-2 and end terminal 102-2 in FIG. 1.

Also, while the term "color" is illustratively used herein to refer to a wavelength and the term "coloring" is illustratively used herein to refer to wavelength assignment, the terms are not so limited. That is, the terms "color" and "coloring" may more generally refer to a bandwidth and a bandwidth assignment, respectively. By way of example only, color may refer to an OC-48 bandwidth on an OC-192 channel, and coloring may refer to the process of allocating one of the four OC-48 bandwidths in the OC-192 channel.

For the sake of convenience of reference, the remainder of the detailed description is divided into the following sections: (1) Introduction; (2) Problem Description and Results; (3) Illustrative Methodologies; (4) Inapproximability Results of Linear Line System Design Problems; (5) Inapproximability Results of Circular Line System Design Problems; and (6) Illustrative Hardware Implementation.

1. Introduction

In an optical line system design problem, we are given the locations (called "nodes") of the end terminals, amplifiers and OADMs and the demands between the nodes. A goal is to assign wavelengths to demands such the total cost of the system is minimized. Note that since full wavelength conversion can take place at the regenerators (i.e., ring terminals), we can divide the line system design problem into multiple independent problems each involving part of the line system between two adjacent regeneration points. The line system design problem presents in two different forms depending on whether the underlying nodes are arranged on a line or arranged on a ring (circle).

The type and cost of the optical amplifier required at a location depends on the wavelengths assigned to the demands routed via the location. Specifically, the cost is more the higher the wavelength to be amplified, and each amplifier type is capable of amplifying all the wavelengths up to a certain maximum.

Motivated by the line system design problem, the invention formulates a generalized graph coloring problem for interval graphs and circular arc graphs. In this problem, we are interested in finding a coloring (e.g., wavelength assignment) and routing (e.g., for circular graphs) of demands of minimum total cost, where the total cost is obtained by accumulating the cost incurred at certain links (e.g., amplifier locations) in the graph. The colors are partitioned in sets and the sets themselves are ordered so that colors in higher sets cost more. The cost of a link in a coloring is equal to the cost of the most expensive set such that a demand going through the link is colored with a color in this set. The invention addresses different versions of the problem and characterizes their complexity by presenting tight upper and lower bounds. For the interval graph, it is shown that the most general problem is hard to approximate to within $\sqrt{s}$ and we complement this result with a $O(\sqrt{s})$-approximation methodology for solving the problem. Here s is proportional to the number of color sets. For the circular graph problem, it is shown that most versions of the problem are hard to approximate to any bounded ratio and we present a $2(1+\epsilon)$ approximation methodology for a special version of the problem.

2. Problem Description and Results

As illustratively used herein, a linear line system comprising n amplifiers is modeled by a number line labeled with n+1 points or nodes, such that there is an amplifier between any two adjacent nodes. The amplifiers are modeled by links between adjacent nodes. Thus, the i-th link, denoted by $e_i$, corresponds to the i-th amplifier and connects the i−1-th and i-th node from the left.

Further, as illustratively used herein, a circular line system comprising n amplifiers is modeled by a circle labeled with n points or nodes, such that there is an amplifier between any two adjacent nodes. The amplifiers are modeled by links between adjacent nodes. Thus, the i-th link, denoted by $e_i$, corresponds to the i-th amplifier and connects the i−1-th node to the i mod n-th node in a clockwise traversal. We assume the node designated as the 0-th node is at coordinate 0 and coordinates and ordering of other nodes is determined in a clockwise traversal of the circle starting from this node.

The set of demands that are to be supported by the line system is denoted by D, where each demand in D is between two nodes of the system. For a linear line system, a demand is thus an interval $[x_1, x_2]$, $x_1 < x_2$ such that $x_1$ and $x_2$ are the coordinates of two nodes on the number line. For a circular line system, a demand denoted by the pair $[x_1, x_2]$, $x_1 < x_2$ can be routed either on the clockwise or anti-clockwise arc connecting node with coordinate $x_1$ to node with coordinate $x_2$. We also represent a demand by a tuple (i, j), $i \leq j$ where, for a linear line system, the demand (i,j) must be routed through links $e_i, e_{i+1} \ldots, e_j$. For a circular line system, the demand (i, j) can be routed either clockwise or anti-clockwise. In the former routing, the demand uses links $e_i, e_{i+1} \ldots, e_j$, and in the latter routing, it uses links $e_{j+1}, e_{j+2} \ldots, e_n, e_1, e_2 \ldots, e_{i-1}$.

The line system is assumed to have r wavelengths (colors) 1, 2 . . . , r. These r colors are partitioned into k sets $C_1$, $C_2, \ldots, C_k$. We use the phrase "circuit packs" to denote these k sets. We assume that the colors of the circuit packs form a non-decreasing sequence. Thus, for all i<j, we have a<b for all $a \in C_i$ and $b \in C_j$. In order to be able to support a wavelength $h_j \in C_i$, a link (amplifier) $e_j$ requires one of the circuit packs $C_i$, $C_{i+1}, \ldots, C_k$. The cost of the circuit packs is assumed to increase linearly, with the cost of $C_i$ being i. Thus, if $h_j \in C_i$ is the largest wavelength (color) supported by link $e_j$, then the cost of the circuit pack used for link $e_j$ is $c(e_j)$=i. The total cost of the line system is then $\Sigma_j c(e_j)$.

It is to be appreciated that, as used herein, each set $C_1$, $C_2, \ldots, C_k$. may be referred to as a "step." Thus, the "step size" may refer to the number of colors in a step, while the "step requirement" may refer to the number of steps one can use to color the demands.

Linear Line System Design Problem: Given a linear line system comprising n amplifiers and a set of demands D, the linear line system design problem (LLSDP) is to assign colors (wavelengths) to demands in D such that no two demands routed on the same link get the same color and the total cost of the circuit packs used for all the links is minimized. Here, the largest color $h_i$ to be supported by link $e_i$ is the largest color assigned to the demands that are routed through link $e_i$.

Circular Line System Design Problem: Given a circular line system comprising n amplifiers and a set of demands D, the circular line system design problem (CLSDP) is to route each demand either clockwise or counterclockwise and to assign colors (wavelengths) to demands in D such that no two demands routed on the same link get the same color and the total cost of the circuit packs used for all the links is minimized. Here, the largest color $h_i$ to be supported by link $e_i$ is the largest color assigned to the demands that are routed through link $e_i$.

We define the load $l_i^R$ of a link $e_i$ for a given routing R of the demands D to be the number of demands using link $e_i$ in R. We define the load $l^R$ of the line system for routing R as $l^R$= max $l_i^R$. Note that there is a unique routing R for the LLSDP, and for this routing R we denote by $l=l^R$ the load of the line system, and by $l_i=l_i^R$ the load of link $e_i$. For CLSDP, let R be the routing for which $l^R$ is minimized. Then, the load of the line system for the CLSDP is denoted by $l=l^R$. Let $l \in C_s$, then for any routing, at least the s-th circuit pack must be used at some link (amplifier) in the line system. We call s the step requirement for the problem. We assume that the number of different circuit packs k is at most c.s for some constant c. This is justified by our result that the optimal solution does not need more than 2l colors for LLSDP (see section 3.6 below).

We use the notation $(\alpha, \beta, \gamma)$ to denote the different problems that we consider herein. Thus, $\alpha=L$ or $\alpha=C$ depending on whether the underlying problem is LLSDP or CLSDP, respectively. Also, $\beta=U$ or $\beta=D$ depending on whether all step sizes (cardinality of sets $C_i$) are the same or different, respectively. Further, $\gamma=E$ or $\gamma=NE$ depending on whether we can exceed the line system step requirement or not (k>s or k=s), respectively. In other words, in the latter case, only colors in $\cup_{i=1}^{s} C_i$ are available for coloring the demands, while in the former case, all colors are available for coloring the demands. We use the wild-card * to indicate all possible values. Thus, for example, (L, U, *) denotes (L, U, E) and (L, U, N, E).

In accordance with the invention, many different variants of the line system problem were considered and the complexity of most of these problems were characterized by presenting tight upper and lower bounds. Results are summarized in FIGS. 2A (general case) and 2B (special case). Details of how these results are derived will be explained in the following sections.

3. Illustrative Methodologies

In this section, we present embodiments of efficient optimal and approximation methodologies for solving the different versions of the line system design problem. We say that in a coloring of the demands a link $e_i$ is colored with t steps if all of the demands through link $e_i$ are colored with colors in $\cup_{j=1}^{t} C_j$ and some demand through link $e_i$ is colored with a color in $C_t$. Note that we can assume without loss of generality that $l_i>0$ for all $e_i$. In this section, we represent a demand by a tuple (i, j), i<j where, for a linear line system, the demand (i, j) must be routed through links $e_i, e_{i+1}, \ldots, e_j$.

Figures 2, 3:
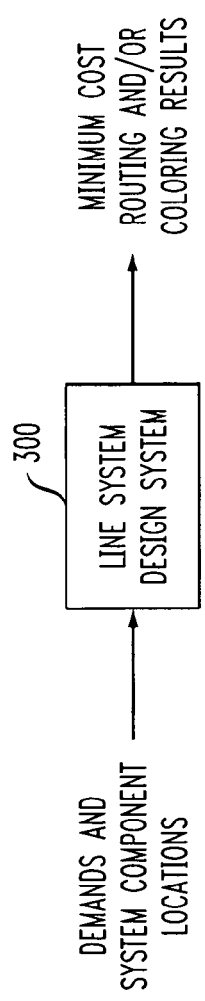
FIG. 3 is a block diagram illustrating a system for designing a line system according to an embodiment of the present invention.

Before describing the illustrative line system design methodologies, reference is made to FIG. 3. FIG. 3 is a block diagram illustrating a system for computing a line system design according to an embodiment of the present invention. In general, the design system 300 receives as input one or more demands and line system component (e.g., terminals, amplifiers, OADMs, etc.) locations. One or more of the line system design methodologies described herein are then employed to compute minimum cost routing and/or coloring results.

Design system 300 may be a standalone computation system or it may be operatively connected to one or more components of a line system (e.g., optical line system 100 of FIG. 1) for which it is computing results. Results computed by design system 300 may be implemented automatically and/or manually so as to realize an efficiently designed line system.

Further, it is to be appreciated that when a line system is deployed, the amplifier placed on each node will be the lowest cost amplifier that can support the colors that the demand going through it are assigned by system 300. Also, the wavelength and route assigned to each demand will be the wavelength and route determined by system 300.

3.1 2-Approximation for the (L, U, *) Problems

In this section, we present a design methodology A for these problems. FIG. 4A depicts design methodology A. It is to be appreciated that a "2-approximation" solution means the solution, in the worst case, will use at most twice the cost of an optimal solution. However, in practice, these solutions may be close to the optimal.

Recall that l and $l_i$ denote the load of the line system and the load of link $e_i$, respectively. Methodology A operates in phases where, in each phase, methodology A colors some demands with at most two new colors, assigned in the order 1, 2, . . . , r. The colored demands are removed from the line system to prepare for the next phase. Let l(p) and $l_i(p)$ denote the load of the line system and the load of link $e_i$, respectively, at the beginning of phase p. Note that l(1)=l and $l_i(1)=l_i$, for all i. We assume that, at the beginning of each phase, $l_i(p) \geq 1$ for all edges $e_i$ for the given instance of the LLSDP. This is because if some $l_i(p)=0$, then the LLSDP instance can be sub-divided into two LLSDP instances, one for edges $e_1$, $e_2, \ldots, e_{i-1}$ and one for edges $e_{i+1}, e_{i+2}, \ldots, e_n$, which can be independently solved.

In phase p for $l(p) \geq 2$, methodology A constructs a directed multi-graph G=(V, E) of n nodes with unit edge capacities in which two units (2-units) of flow can be routed from a source to a sink node. The nodes V={0, 1, . . . , n−1}. For every demand (i, j)∈D that is still uncolored in this phase, a directed edge (i−1, j) of unit capacity is added to E. For every link $e_i$ for which $l_i(p)<l(p)$, an edge (i−1, i) of unit capacity is in E. Node 0 is the source node and node n−1 is the sink node. It is easy to see that 2-units of flow can be routed in the graph since every cut between the source and sink has capacity of at least 2, and moreover since all edge capacities are integral, this flow is routed over exactly two paths $P_1$ and $P_2$. Let the smallest index of the color not used by methodology A in phase p be m(p) (m(p)=1 in the first phase).

In phase p, methodology A assigns color $c_{m(p)}$ to all demands for which there is an edge in $P_1$ and assigns color $c_{m(p)+1}$ to all demands for which there is an edge in $P_2$. For the next phase, we have m(p+1)=m(p)+2. Let $d_i$ be the number of demands through edge $e_i$ that are assigned color in phase p. Note that $d_i \leq 2$. Then, $l_i(p+1)=l_i(p)-d_i$ for edge $e_i$ and l(p+1) is set to the maximum $l_i(p+1)$. In the case where l(p)=1, then in phase p of the methodology, all the uncolored demands are non-overlapping and the methodology colors them with the smallest available color.

It can be proven that methodology A is a 2-approximation for the (L, U, *) problems.

3.2 2(1+ϵ)-Approximation for the (C, U, E) Problem for Constant Step Size

FIG. 4B depicts the methodology that addresses this problem.

Note that this problem has two aspects: one of selecting a routing for each demand (clockwise or anti-clockwise) and one of coloring the routed demands. The design methodology for solving this problem decouples these two aspects and operates in two phases. In the first phase, the methodology computes a routing R of the demands and, in the second phase, colors the routed demands. We describe these two phases separately. Our results imply a 2(1+ϵ) polynomial approximation scheme for the (C, U, E) problem. In the following, we let L(R)=

$$\sum_{i=1}^{n} c(l_i^R)$$

denote the load based lower bound on the cost of routing R.

Routing phase: Let ϵ>0 be given. Let n be the number of links. Let D be the set of demands. Let S denote the size of each step ($|C_i|$=S, ∀i). We assume S is a constant. Let the shortest path routing $R_s$ be defined as a routing in which every demand is routed in the direction in which it goes through a smaller number of links. In case a demand goes through the same number of links in either direction, then it is routed arbitrarily in $R_s$. If the cost lower bound $L(R_s) \geq n(1+\epsilon)/\epsilon$, then $R_s$ is the routing output by the methodology. Otherwise, the set of demands D is partitioned into two sets $D_1$ and $D_2$. Here, d∈$D_1$ if an only if d goes through at least n/3 links in any of the two possible routings of d. The methodology tries all possible routings $\mathcal{R}$ in which demands in $D_1$ are routed in either direction, while at most 3S demands in the set $D_2$ are routed in the direction where they go through more links (not on the shortest path). Let $R \in \mathcal{R}$ be a routing for which the cost lower bound $L(R)$ is minimized. The methodology outputs routing R.

Let $R^*$ be a routing for which $L(R^*) = \min_R L(R)$.

If the cost lower bound $L(R_s) \geq n(1+\epsilon)/\epsilon$, then $L(R_s) \leq (1+\epsilon)L(R^*)$.

If the cost lower bound $L(R_s) \leq n(1+\epsilon)/\epsilon$, then $|D_1| \leq 3S(1+\epsilon)/\epsilon$.

If the cost lower bound $L(R_s) \leq n(1+\epsilon)/\epsilon$, then in $R^*$ at most 3S demands in $D_2$ are routed in the longer direction (where they go through more links).

The routing R output by the methodology satisfies $L(R) \leq (1+\epsilon)L(R^*)$.

The running time of the routing phase of the methodology is $O(2^{3P}(nP+3S)^{3S})$ where $P = S(1+\epsilon)/\epsilon$.

Coloring Phase: Let R be the routing output by the routing phase of the methodology. Here, let D be the set of demands and let L be the set of links. The coloring phase of the methodology itself is sub-divided into at most two phases. The first phase involves repeatedly finding a subset of uncolored demands that can be colored with two colors and that go through all the n links in R. These demands are then colored with the smallest available two colors (that have not been used for coloring any other demands). Thus, one iteration of this sub-phase, which is only possible if every link is contained in some demand, operates as follows. Select an uncolored demand $d_0$ that in routing R goes through the largest number of links. If $d_0$ goes through all the links, the sub-phase is complete. Otherwise, select another uncolored demand $d_1$ overlapping with $d_0$ and that in routing R goes through the largest number of links not covered by demand $d_0$ in the clockwise direction. If $d_1$ and $d_0$ go through all the links, the sub-phase is complete. Otherwise, another uncolored demand $d_2$ overlapping with $d_1$ is selected that in routing R goes through the largest number of links not covered by demands $d_0$ and $d_1$ in the clockwise direction and so on. It is easy to see that as long as the uncolored demands cover all links, the iteration in this sub-phase of the methodology outputs uncolored demands $d_0, d_1, \ldots$ that cover all links and are 2-colorable. Note that this part of the methodology is illustrated in FIG. 4B as "Compute O=H(U)," wherein the methodology gets as input a set of demands U and returns a set O of demands that are 2-colorable and that go through all the links L of the line system. It is to be appreciated that stating that the demands are "2-colorable" means that all the demands can be colored with just two colors in such a way that no two overlapping demands gets the same color.

The second sub-phase of the coloring phase of the methodology begins when the set of uncolored demands do not go through all links. Let $e_j$ be one such uncovered link. It is easy to see that if the circle on which the links are arranged is cut at link $e_j$ and link $e_j$ is omitted, then we get an instance of the (L, U, E) problem, for the uncolored demands, which is solved using the methodology A presented above in section 3.1.

Thus, if we let R be the routing output by the routing phase of the methodology, then the cost of the coloring output by the coloring phase of the methodology is at most $2L(R)$.

It can be proven that this methodology is a $2(1+\epsilon)$-approximation for the (C, U, E) problem with constant step size.

3.3 Special Polynomial Cases

In this section, we show that some special cases of the line system design problem are polynomially solvable. In the following, T denotes the (polynomial) complexity of coloring an interval graph.

(L, *, E) problems when k=2 and $|C_2|=\infty$: Note that in this case, the problem is to find a coloring of the demands so as to maximize the number of links $e_i$ that are colored with one step. Note that any such $e_i$ must have $c(l_i) \leq 1$. The special version of the problem, where we are given the partition $S_1$ and $S_2$ of links that are colored with one and two steps, respectively, and where we want to compute (if it exists) a coloring of demands with such a partition, can be solved in polynomial time as follows. Let $D_1 \subset D$ be the set of demands that go through at least one link in $\overline{S_1}$. Note that in any feasible coloring, all demands in $D_1$ must be colored with one step (colors in $C_1$) only. Such a coloring (if it exists) can be computed in polynomial time since this corresponds to coloring of the interval graph formed by demands in $D_1$ with colors in $C_1$.

We denote the methodology presented below as methodology B. FIGS. 4C and 4D depict design methodology B (note that methodology B in FIG. 4C calls methodology b1 in FIG. 4D, and thus methodology b1 is considered a part of methodology B). Methodology B uses dynamic programming. Let the set of links be augmented with links $e_0 = (-1, 0)$ and $e_{n+1} = (n, n+1)$ and the set of demands be augmented with demands $(0, 0)$ and the demand $(n+1, n+1)$. Thus, $l_0 = l_{n+1} = 1$ and in any optimal coloring of the demands both the links $e_0$ and $e_{n+1}$ are colored with one step. Define $P(i, j)$, $0 \leq i \leq j \leq n+1$ to be an optimal coloring for links $e_i, e_{i+1}, \ldots, e_j$ (that maximizes the number of these links colored with one step) in which links $e_i$ and $e_j$ are colored with one step. Let $R(i, j)$, $0 \leq i \leq j \leq n+1$ denote an optimal coloring such that there exist $i \leq i' \leq j' \leq j$ where all links $e_i, e_{i+1}, \ldots, e_{i'}$ and $e_{j'+1}, e_{j'+2}, \ldots e_j$ are colored with one step and all links $e_{i'+1}, e_{i'+2}, \ldots, e_{j'}$ are colored with two steps. Note that $R(i, j)$ can be computed in $O(n^2T)$ by trying out all feasible values for i' and j' and for each fixed value of i' and j' checking if the interval graph formed by the demands that go through at least one link $e_i, e_{i+1}, \ldots, e_{i'}$ or $e_{j'+1}, e_{j'+2}, \ldots, e_j$ is $|C_1|$ colorable. If no such i' and j' exists then $R(i, j)$ is undefined.

Note that $P(i, j)$ and $R(i, j)$ are defined only if $l_i, l_j \leq |C_1|$. Let $P(i, m)$ and $P(m, j)$ be defined and given for some $i < m < j$, then an optimal coloring for links $e_i, e_{j+1}, \ldots, e_j$ in which links $e_i$, $e_j$ and $e_m$ are colored with one step can easily be obtained by combining the two colorings. The combining involves permuting the colors in $C_1$ for the coloring $P(m, j)$ such that demands going through link $e_m$ are assigned the same color in the two colorings $P(i, m)$ and $P(m, j)$. It is easy to see that this can be done in polynomial time. We denote the coloring obtained by combining $P(i, m)$ and $P(m, j)$ by $P(i, m)+P(m, j)$.

Consider $P(i, j)$. If $P(i, j)$ is defined, then either there exists some $i < m < j$ such that in $P(i, j)$ link $e_m$ is also colored with one step or $P(i, j) = R(i, j)$. Thus, $P(i, j)$ is computed by taking the best coloring among $P(i, m)+P(m, j)$, $i < m < j$ and $R(i, j)$. Note that $P(0, n+1)$ is an optimal coloring for the given LLSDP instance. Thus B is an $O(n^4T)$ methodology.

Note also that, in accordance with methodology b1 (FIG. 4D), two sets of links $E_1$ and $E_2$ are given and a coloring is found in which demands $D_1$ (in D) going through links in $E_1$ are colored with colors in $C_1$ only.

(L, *, N E) problems when k=2: Methodology C for this problem works essentially as methodology B, described above, for the (L, *, E) problem when k=2 and r is very large. The only difference is the way the following special version of the problem is solved by methodology C in polynomial time. In the special version of this problem, we are given the partition $S_1$ and $S_2$ of links that are colored with one and two steps, respectively, and we want to compute (if it exists) a coloring of demands that results in such a partition. Note that for a coloring to exist, we must have $1 \leq |C_1| + |C_2|$, which we assume in the following. Methodology C constructs a directed multi-graph G=(V, E) of n nodes with edge capacities in which nodes V={0, 1, ..., n−1}. Nodes 0 and n−1 are the source and sink nodes of G. For every demand (i,j)∈D that does not go through any link in $S_1$, a directed edge (i−1, j) of unit capacity is added to E. For every link $e_i$, an edge (i−1, i) of capacity $|C_1|+|C_2|-l_i$ is in E.

$|C_2|$ flow from the source to the sink is possible in G if and only if there is a coloring for the special version of the problem. Also given such a flow, the coloring can be obtained in polynomial time.

It is to be appreciated that FIG. 4E illustrates the part of methodology C that is different than methodology B. More particularly, FIG. 4E depicts methodology c1 which is used instead of methodology b1 (FIG. 4D).

3.4 O√s-Approximation for the (L, *, *) Problems

Recall that s is the step requirement for the problem, i.e., the load l of the line system satisfies l∈$C_s$. Recall that for the (L, *, N E) problems, the demands can only be colored with colors in $\cup_{i=1}^{s} C_i$, while for the (L, *, N E) problems all colors $\cup_{i=1}^{k} C_i$ are available for coloring the demands. Let t=s in the former case, and t=k in the latter case, denote the number of available steps for the given instance of the (L, *, *) problem. Below, we present a O(√t) approximation methodology for the (L, *, *) problems. Recall that the number of distinct circuit packs (or steps) k is at most c.s for some constant c. Thus, O(√t) equals O(√s).

Figure 4F:
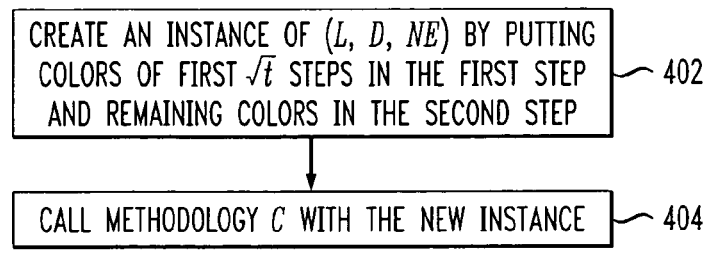

FIG. 4F depicts methodology D for solving these problems. Methodology D operates by creating (402 in FIG. 4F) an instance of the problem (L, D, N E) with two steps (k=2). The first step $C_1$ comprises all the colors in $C_1'=\cup_{i=1}^{\sqrt{t}} C_i$ and the second step $C_i'$ contains all the remaining colors $C_2'=\cup_{i=\sqrt{t}+1}^{t} C_i$. Methodology D uses (4040 in FIG. 4F) methodology C presented above in section 3.3 to optimally solve the constructed (L, D, N E) instance in polynomial time. It may be proven that the solution thus obtained is a good approximation to the optimal solution for the given (L, *, *) problem instance. Thus, the cost of the optimal solution of the constructed (L, D, N E) instance with k=2 is at most O(√t) times the cost of the optimal solution to the original (L, *, *) problem instance as well.

3.5 4/3-Approximation for the (L, U, E) Problem when s=2

In this case, we assume k≧3. Let P be an optimal solution to the given problem instance. Let $n_1$ and $n_2$ be the number of links that are colored with one and two steps in P. Let $n_3=n−(n_1+n_2)$. Thus, $n_3$ links are colored with at least three steps in P. Thus, the cost of the optimal solution P is at least $n_1 2n_2+3n_3=2n+n_3−n_1$.

Figure 4G:
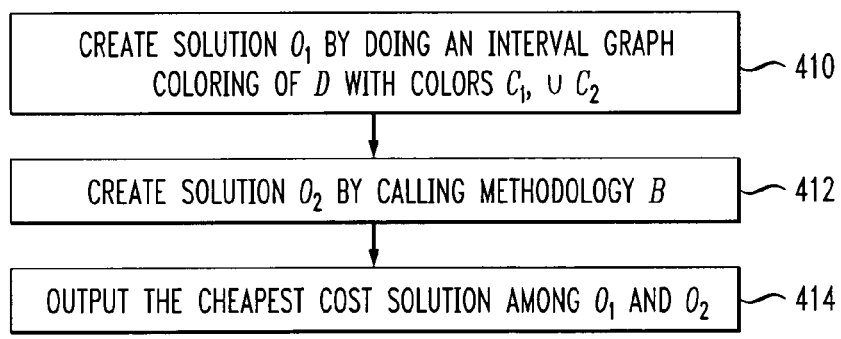

FIG. 4G depicts methodology E for solving this problem. Methodology E operates by computing two solutions $O_1$ and $O_2$ for the given problem instance and by outputting the solution of the smaller cost. The first solution $O_1$ is obtained (410 in FIG. 4G) by coloring the interval graph formed by all the demands, with colors $C_1 \cup C_2$. Note that the cost of this solution is at most 2n. The second solution is computed (412 in FIG. 4G) by invoking methodology B presented above in section 3.3 to compute the set of demands that are colored by step one colors ($C_1$) so as to maximize the number of links colored with one step. Let $D_1$ be the set of demands output by methodology B that are colored by step one colors. The remaining demands in $D-D_1$ are colored by coloring the interval graph corresponding to these demands with colors in $C_2 \cup C_3$. $O_2$ is the coloring obtained by this procedure. Methodology E outputs the cheapest cost solution among $O_1$ and $O_2$ (414 in FIG. 4G).

Thus, it can be proven that the solution of the smaller cost among $O_1$ and $O_2$ is at most 4/3 times the cost of the optimal solution P.

3.6 Color Requirements for (L, *, E)

The invention realizes that there exists an optimal solution for (L, *, E) which does not use more than 2l colors.

This may be proven as follows. Let $I_1$ be an instance of the (L, *, E) problem and let S be the optimal solution for $I_1$ which uses more than 2l colors. Let m be the maximum color used by S. Let (i, j) be the longest demand (i.e. goes through maximum number of links) which is assigned color m in S. We create a solution S' from S which is of cost the same or less than cost of S and in S' either the longest demand which is assigned color m is strictly smaller (in terms of contained links) than (i, j) or no demand is assigned color m. Note that the load on the links $e_i$ and $e_j$ is ≦l and the demand (i, j) going through these links uses color m>2l. Thus at most l−1 demands going through each one of these links use colors 1, . . . , 2l. Hence there exists a color less than 2l which is not used by the demands that go through either link $e_i$ or $e_j$. Let this be color p. Consider all the demands with this color that go through at least on of the links $e_{i+1}, \ldots, e_{j-1}$. If no such demand exists then S' is obtained by assigning color p to demand (i, j). If such demands exist then we can assign these demands the color m and assign (i, j) the color p in S'. In both cases the cost of S' is at most the cost of S and the length of the largest demand using the color m in S' is strictly less than that of S. Continuing this argument, we get an optimal solution of $I_1$ which doesn't use more than 2l colors.

4. Inapproximability Results for Linear Line System Design Problem

In this section, we establish the lower bounds on various linear line system design problems.

(L, D, N E) for s=3: It can be proven that (L, D, N E) is NP-hard for s=3; (L, D, N E) with s=3 is in-approximable within a factor of $$1 + \frac{1}{6}$$

unless P=NP; and (L, D, E) with s=3 is NP-hard.

Inapproximability of (L, D, *) problems: It can be proven that (L, D, N E) is not approximable within a factor of Ω (√m) for s=m+√m+1, thus implying Ω (√s) inapproximability for (L, D, N E). Further, it can be proven that (L, D, N E) is Ω (√s) in-approximable; (L, D, E) is Ω (√s) in-approximable; and (L, U, *) is NP-hard and (L, U, N E) is $1+1/s^2$ in-approximable.

5. Inapproximability of Circular Line System Design Problems

It can be proven that (C, *, N E) is hard to approximate to any bounded ratio; (C, D, E) is hard to approximate to any bounded ratio; (C, *, E) has the same inapproximability ratio as (L, *, E); (L, U, *) is NP-hard for $|C_i|=1$; and (L, U, N E) is $1+1/s^2$ inapproximable.

6. Illustrative Hardware Implementation

Figure 5:
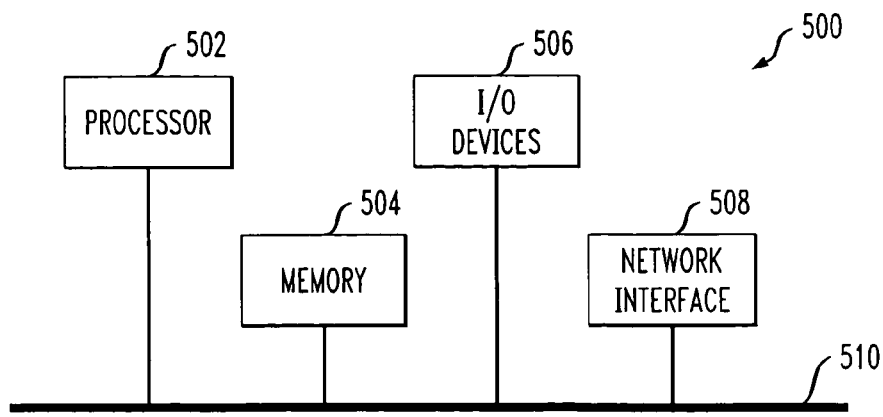
FIG. 5 is a block diagram illustrating a generalized hardware architecture of a computer system suitable for implementing a system for designing a line system according to an embodiment of the present invention.

Referring now to FIG. 5, a block diagram illustrates a generalized hardware architecture of a computer system suitable for implementing a system for designing a line system, according to an embodiment of the present invention. More particularly, it is to be appreciated that design system 300 in FIG. 3 may implement such a computing system 500 to perform the methodologies of the invention. Also, one or more line system components (e.g., in line system 100 of FIG. 1) may implement such a computing system 500. Of course, it is to be understood that the invention is not limited to any particular computing system implementation.

In this illustrative implementation, a processor 502 for implementing at least a portion of the methodologies of the invention is operatively coupled to a memory 504, input/output (I/O) device(s) 506 and a network interface 508 via a bus 510, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the design inputs used by a design system of the invention to generate design results. Alternatively, the design inputs could be read into the design system from a diskette or from some other source (e.g., another computer system) connected to the computer bus 510. Also, inputs to the design methodologies may be obtained in accordance with the one or more input devices. The output devices may be one mechanism for a user or other computer system to be presented with results of the design methodologies.

Still further, the phrase "network interface" as used herein is intended to include, for example, one or more devices capable of allowing the computing system 500 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of design systems, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 502.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of designing a line system, the method comprising a computer performing the steps of:
    obtaining a set of one or more demands for use in computing the line system design, wherein the one or more demands comprise one or more bandwidth requests;
    representing the line system design as a graph in accordance with a graph coloring operation wherein colors represent bandwidths such that bandwidths are assigned and the one or more demands are routed so as to attempt to achieve a minimum total design cost; and
    specifying a line system design based on the assigned bandwidths and the routed demands.

2. The method of claim 1, wherein colors are partitioned in sets and the sets are ordered so that colors in higher sets cost more than colors in lower sets.

3. The method of claim 2, wherein a link of the graph represents a location of a component of the line system being designed.

4. The method of claim 3, wherein a cost of a link in a coloring is equal to a cost of the most expensive set such that a demand going through the link is colored with a color in the most expensive set.

5. The method of claim 3, further wherein colors are assigned to the demands such that no two demands routed on the same link of the graph are assigned the same color.

6. The method of claim 1, wherein the line system being designed is a linear line system.

7. The method of claim 6, further comprising the step of representing the line system design by an interval graph.

8. A method of designing a line system, the method comprising a computer performing the steps of:
    obtaining a set of one or more demands for use in computing the line system design;
    representing the line system design as a graph in accordance with a graph coloring operation, wherein colors represent bandwidths such that bandwidths are assigned and the one or more demands are routed so as to attempt to achieve a minimum total design cost;
    computing the graph coloring operation to an $O(\sqrt{s})$ -approximation, where s is a value proportional to a number of color sets; and
    specifying a line system design based on the assigned bandwidths and the routed demands.

9. The method of claim 1, further comprising the step of polynomially computing the graph coloring operation.

10. A method of designing a line system, the method comprising a computer performing the steps of:

obtaining a set of one or more demands for use in computing the line system design, wherein the line system being designed is a circular line system;

representing the line system design as a graph in accordance with a graph coloring operation, wherein colors represent bandwidths such that bandwidths are assigned and the one or more demands are routed so as to attempt to achieve a minimum total design cost;

computing the graph coloring operation to a $2(1+\epsilon)$-approximation; and specifying a line system design based on the assigned bandwidths and the routed demands.

11. The method of claim 10, wherein a link of the graph represents a location of a component of the circular line system being designed.

12. The method of claim 11, wherein a demand is routed either clockwise or counterclockwise and colors are assigned to demands such that no two demands routed on the same link are assigned the same color.

13. The method of claim 1, wherein the line system being designed is an optical line system.

14. Apparatus for designing a line system, the apparatus comprising:

a memory; and at least one processor coupled to the memory and configured to: (i) obtain a set of one or more demands for use in computing the line system design, wherein the one or more demands comprise one or more bandwidth requests; (ii) represent the line system design as a graph in accordance with a graph coloring operation wherein colors represent bandwidths such that bandwidths are assigned and the one or more demands are routed so as to attempt to achieve a minimum total design cost; and (iii) specify a line system design based on the assigned bandwidths and the routed demands.

15. The apparatus of claim 14, wherein colors are partitioned in sets and the sets are ordered so that colors in higher sets cost more than colors in lower sets.

16. The apparatus of claim 15, wherein a link of the graph represents a location of a component of the line system being designed.

17. The apparatus of claim 16, wherein a cost of a link in a coloring is equal to a cost of the most expensive set such that a demand going through the link is colored with a color in the most expensive set.

18. The apparatus of claim 16, further wherein colors are assigned to the demands such that no two demands routed on the same link of the graph are assigned the same color.

19. The apparatus of claim 14, wherein the line system being designed is a linear line system.

20. The apparatus of claim 19, wherein the processor is further configured to represent the line system design by an interval graph.

21. Apparatus for designing a line system, the apparatus comprising:

a memory; and at least one processor coupled to the memory and configured to: (i) obtain a set of one or more demands for use in computing the line system design; (ii) represent the line system design as a graph in accordance with a graph coloring operation wherein colors represent bandwidths such that bandwidths are assigned and the one or more demands are routed so as to attempt to achieve a minimum total design cost; (iii) compute the graph coloring operation to an $O(\sqrt{s})$-approximation, where s is a value proportional to a number of color sets; and (iv) specify a line system design based on the assigned bandwidths and the routed demands.

22. The apparatus of claim 14, wherein the processor is further configured to polynomially compute the graph coloring operation.

23. The apparatus of claim 14, wherein the line system being designed is a circular line system.

24. Apparatus for designing a line system, the apparatus comprising:

a memory; and at least one processor coupled to the memory and configured to: (i) obtain a set of one or more demands for use in computing the line system design, wherein the line system being designed is a circular line system; (ii) represent the line system design as a graph in accordance with a graph coloring operation wherein colors represent bandwidths such that bandwidths are assigned and the one or more demands are routed so as to attempt to achieve a minimum total design cost; (iii) compute the graph coloring operation to a $2(1+\epsilon)$-approximation; and (iv) specify a line system design based on the assigned bandwidths and the routed demands.

25. The apparatus of claim 23, wherein a link of the graph represents a location of a component of the circular line system being designed.

26. The apparatus of claim 25, wherein a demand is routed either clockwise or counterclockwise and colors are assigned to demands such that no two demands routed on the same link are assigned the same color.

27. The apparatus of claim 14, wherein the line system being designed is an optical line system.

28. An article of manufacture for designing a line system, comprising a machine readable storage medium containing one or more programs which when executed implement the steps of:

obtaining a set of one or more demands for use in computing the line system design, wherein the one or more demands comprise one or more bandwidth requests;

representing the line system design as a graph in accordance with a graph coloring operation wherein colors represent bandwidths such that bandwidths are assigned and the one or more demands are routed so as to attempt to achieve a minimum total design cost; and specifying a line system design based on the assigned bandwidths and the routed demands.

* * * * *